(12) United States Patent
Ros

(10) Patent No.: US 8,795,766 B1
(45) Date of Patent: Aug. 5, 2014

(54) SAND TEMPERATURE AND FLOW CONTROL SYSTEM FOR A SAND COATING PROCESS

(76) Inventor: Fabian Ros, Hoover, AL (US)

( * ) Notice: Subject to any disclaimer, the term of this patent is extended or adjusted under 35 U.S.C. 154(b) by 0 days.

(21) Appl. No.: 13/403,569

(22) Filed: Feb. 23, 2012

(51) Int. Cl.
*B05D 7/00* (2006.01)

(52) U.S. Cl.
USPC .......................................... 427/212; 427/221

(58) Field of Classification Search
USPC .......... 427/212, 226, 214, 213, 221; 428/407; 118/303
See application file for complete search history.

(56) References Cited

U.S. PATENT DOCUMENTS

| | | | |
|---|---|---|---|
| 4,778,503 A * | 10/1988 | Propster et al. | 65/27 |
| 4,938,605 A * | 7/1990 | Friedrich | 366/76.2 |
| 5,218,038 A | 6/1993 | Johnson et al. | |
| 5,639,806 A | 6/1997 | Johnson et al. | |
| 7,153,575 B2 | 12/2006 | Anderson et al. | |
| 7,241,139 B2 * | 7/2007 | Zhu | 432/58 |
| 7,267,876 B2 | 9/2007 | Okubo et al. | |
| 7,270,879 B2 | 9/2007 | McCrary | |
| 2008/0176009 A1 * | 7/2008 | Chereau et al. | 428/17 |
| 2008/0230223 A1 | 9/2008 | McCrary et al. | |
| 2009/0196991 A1 * | 8/2009 | Mizwicki et al. | 427/213.33 |
| 2010/0256024 A1 | 10/2010 | Zhang | |

OTHER PUBLICATIONS

Ackland, "Selecting the Right Infrared Temperature Sensor", InTech, Jun. 1998, p. 48-52.*

* cited by examiner

*Primary Examiner* — Frederick Parker
*Assistant Examiner* — Ann Disarro
(74) *Attorney, Agent, or Firm* — Bush Intellectual Property Law; Kenneth M. Bush

(57) ABSTRACT

A sand temperature and flow control system for coating sand using a sand heater, a sand batch mixer, and a continuous mixer. A heater burner combustion blower draws ambient air through a heat exchanger and delivers hot air to a sand heater. A cyclone fan draws hot exhaust air from the sand heater through the heat exchanger. The sand heater is filled with sand and heated to a desired temperature. The heated sand is delivered into the sand batch mixer to form a coating on the sand and the coated sand is delivered to a continuous mixer. The entire process of filling the sand heater with sand, heating the sand, delivering the heated sand into the sand batch mixer, and delivering coated sand from the sand batch mixer to the continuous mixer is a continuous process producing a final product of coated sand continuously.

9 Claims, 3 Drawing Sheets

SAND TEMPERATURE AND FLOW CONTROL SYSTEM FOR A SAND COATING PROCESS

FIELD OF THE INVENTION

The present invention relates to resin coated particles and a method for their manufacture, and in particular, to a system for heating sand particles, recovering the heat, and providing continuous sand heating, sand batch mixing, and coated sand flow for a batch sand coating process.

BACKGROUND OF THE INVENTION

The use of resin-coated proppants or propping agents is increasingly important in treating subterranean formations. In hydraulic fracturing, particles such as sand are coated and used to maintain a fracture formation in a propped open condition. The coating improves the stability of proppants at high closure stresses. Sand or similar substrates have been coated with resins such as an epoxy, furan, or phenolic resin to create proppants. Fracturing of the subterranean formation is conducted to increase oil and/or gas production. Fracturing is caused by injecting a viscous fracturing fluid or a foam at a high pressure into the well to form the fracture. Proppants are used to increase production of oil and/or gas by providing a conductive channel in the formation. As the fracture is formed, the proppant is placed in the formation to maintain the fracture in a propped condition when the injection pressure is released. As the fracture forms, the proppants are carried into the fracture by suspending them in additional fluid or foam to fill the fracture with a slurry of proppant in the fluid or foam. Upon release of the pressure, the proppants form a pack that serves to hold open the fractures. The propped fracture thus provides a highly conductive channel in the formation.

Coating particles, such as sand and the like, with resins is relatively complex when heating the particle or sand is required to melt the resin. It is necessary to heat only the surface of the sand grain and not the interior of the grain. This is an expensive process which requires a considerable amount of time, monitoring, precise control and production of heat. Control systems can be designed to reliably control physical system components in the presence of external disturbances, variations among physical components due to manufacturing tolerances, and changes in inputted set-point values for controlled output values. Control systems usually have at least one measuring device, which provides a reading of a process variable, which can be fed to a computer controller, which then can provide a control signal to an actuator, which then drives a final control element acting on, for example, a flow stream of heat or product. Examples of final control elements include flow control valves, speed controlled pumps, conveyors, augers, and screws. A control system, in some cases, can be designed to remain stable and avoid oscillations within a range of specific operating conditions. A well-designed control system can, in some cases, significantly reduce the need for human intervention, even during upset conditions in an operating process, and reduce the time and cost of manufacturing a product.

Control systems for heating sand, mixing and coating heated sand, and final coated sand flow processing are not completely continuous. A completely continuous process for making a final product of coated sand would significantly improve the quality of the final product while reducing its cost.

SUMMARY OF THE INVENTION

This invention is a sand temperature and flow control system for coating sand with a sand heater, a sand batch mixer, and a continuous mixer. A heater burner combustion blower draws ambient air through an external portion of a heat exchanger and delivers the ambient air to a sand heater burner and then to the sand heater. A cyclone fan draws exhaust air from the sand heater through an internal portion of the heat exchanger, wherein the exhaust air heats the ambient air in the external portion of the heat exchanger. The sand heater is filled with sand and the sand is then heated to a desired temperature. The heated sand is delivered into the sand batch mixer to form a coating on the sand. The coated sand is delivered from the sand batch mixer to a continuous mixer, wherein the entire process of filling the sand heater with sand, heating the sand in the sand heater to a desired temperature, delivering the heated sand into the sand batch mixer to form a coating on the sand, and delivering the coated sand from the sand batch mixer to the continuous mixer thereby produces a final product of coated sand continuously.

The sand heater has one or more temperature sensors and a discharge chute with one or more thermally isolated temperature sensors, wherein the temperature sensors and the thermally isolated temperature sensors provide temperature signals to a computer system, whereby the computer system uses the temperature signals to activate the sand heater burner to maintain temperature in the sand heater at a desired level. The sand batch mixer provides event signals to the computer whereby the computer activates the continuous mixer to operate at a first desired speed prior to the sand batch mixer delivering the coated sand to the continuous mixer, and then the computer activates the continuous mixer to operate at a second desired speed slower than the first desired speed to maintain a desired level of the sand in the continuous mixer. The discharge chute of the sand heater has a diverter chute therein which diverts flowing sand from the discharge chute to an external chute. The thermally isolated temperature sensor is positioned within the external chute and does not contact the flowing sand. The cyclone fan draws the exhaust air from the sand heater through a cyclone particle separator for removal of particles from the exhaust air.

An advantage of the present invention is a process for converting the batch mixing process into a continuous mixing process by regulating the delivery of the batch mixer to the continuous mixer at a continuous rate, thereby eliminating system surges, increasing production rate, decreasing production costs, and improving the quality of the final product.

Another advantage is a cyclone particle separator which regulates overall system static pressure fluctuations, thereby improving sand heater operation.

Another advantage is a diverter chute in the sand heater discharge chute which diverts sand flow to an external chute whereby an infrared temperature sensor therein captures the real time sand temperature. Conventional contact temperature sensors are not able to capture the real time sand temperature. The infrared temperature sensor in the external chute is thermally isolated and does not come into contact with the flowing sand.

Another advantage is a method of regulating the speed of the continuous mixer so that when coated sand is discharged instantly into the continuous mixer the level of sand in the continuous mixer is maintained at a desired height, thereby allowing downstream processing of coated sand continuously at a constant rate.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
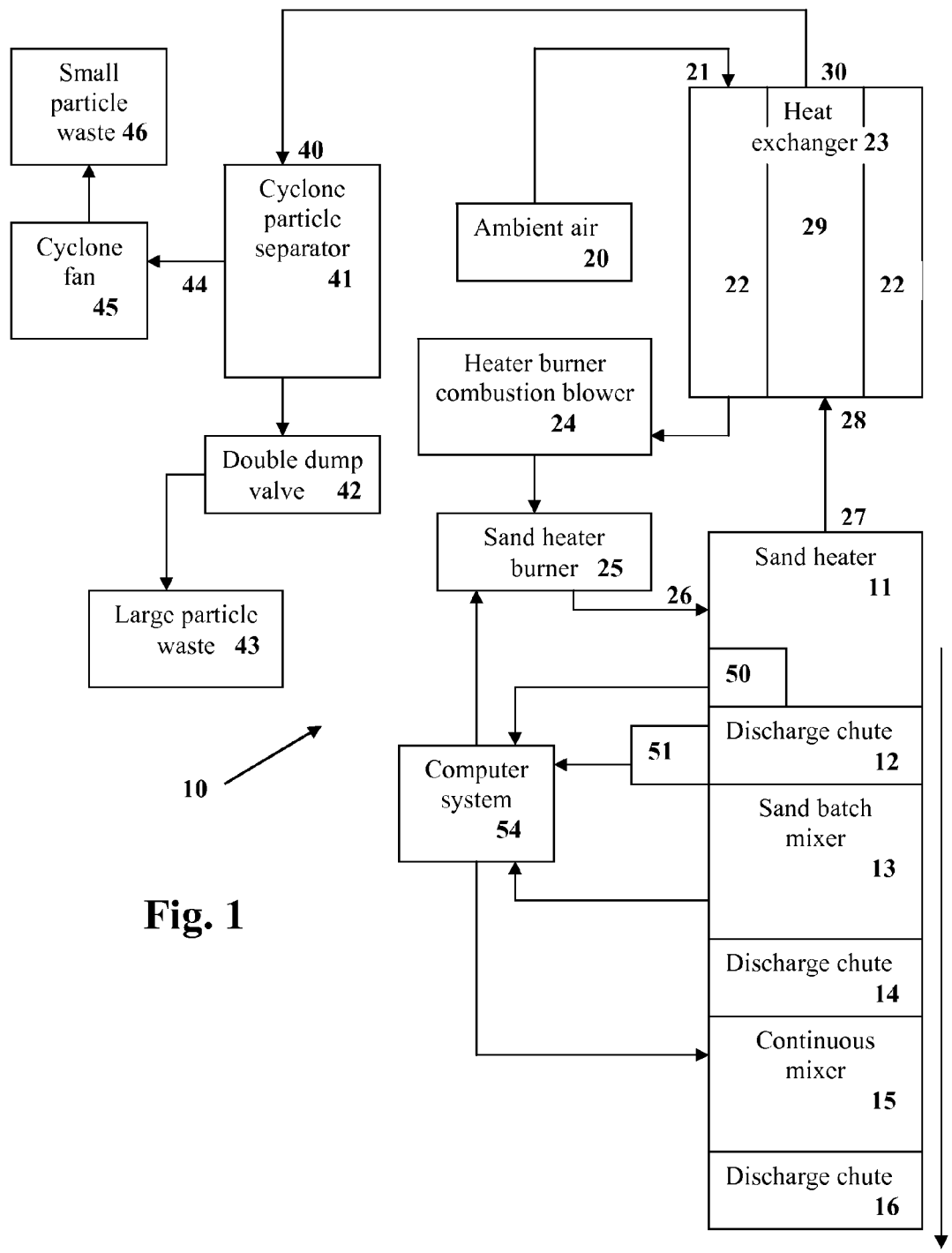
FIG. 1 illustrates a flow diagram of the system of the invention.

The sand temperature and flow control system 10 of the present invention is shown in FIG. 1. The system 10 has a sand heater 11 with a discharge chute 12. Discharge chute 12 interfaces with a sand batch mixer 13 having a discharge chute 14. Discharge chute 12 empties the heated sand into the sand batch mixer 13. Discharge chute 14 empties the resin coated sand onto a continuous mixer 15. The continuous mixer 15 completes the final steps of the sand coating process and delivers the finished product through discharge chute 16.

In order to heat the sand for coating, the sand is placed into the sand heater 11. Ambient air 20 is delivered through the intake 21 of an external portion 22 of a heat exchanger 23, by means of a heater burner combustion blower 24. The heater burner combustion blower 24 sends the preheated ambient air to a sand heater burner 25 which then delivers hot air into the intake 26 of sand heater 11. The outflow of hot air leaves the sand heater 11 through exhaust 27 by means of a fan, preferably a cyclone fan 45. The exhaust 27 is drawn into the intake 28 of an internal portion 29 of the heat exchanger 23 and exits the internal portion 29 of heat exchanger 23 through exhaust 30 by the cyclone fan 45. Exhaust 30 is drawn to an intake 40 of a cyclone separator 41 which separates large particles from the hot exhaust air and eliminates them through a double dump valve 42 as large particle waste 43. The hot air leaves the cyclone separator 41 through exhaust 44 by means of the cyclone fan 45 which delivers small particle waste 46.

Figure 2:
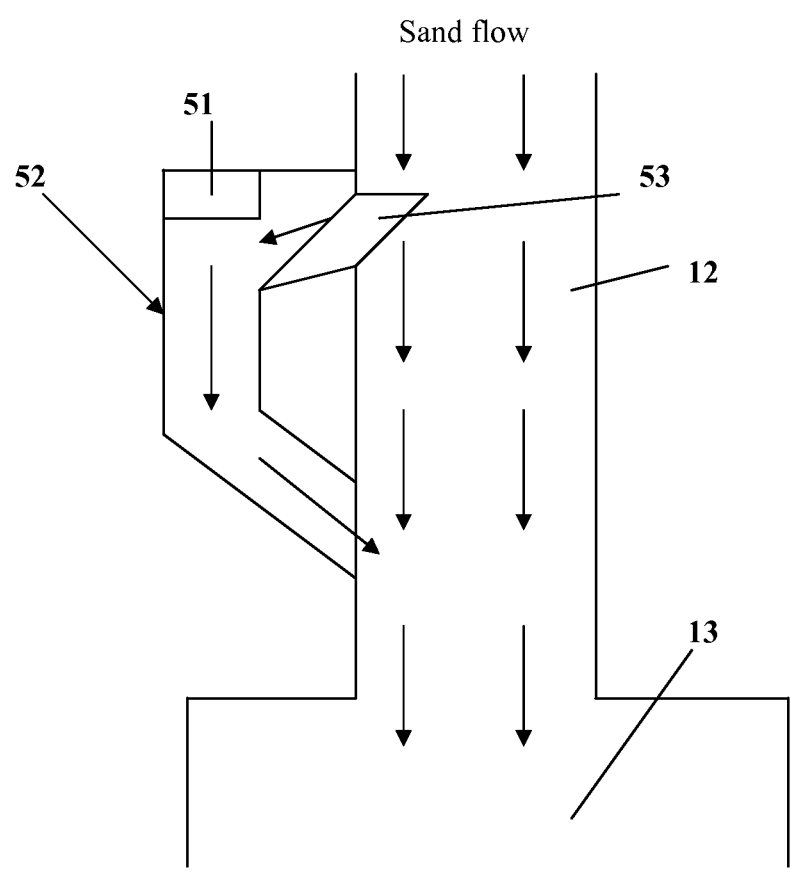
FIG. 2 shows a detailed illustration of the external chute having the external infrared temperature sensors.

There are one or more temperature sensors 50 in the sand heater 11 at the bottom of sand heater 11 to monitor the temperature of the sand in the sand heater 11. There are one or more temperature sensors 51 positioned externally from the discharge chute 12 to monitor temperature of the sand as it enters the sand batch mixer 13. FIG. 2 shows a detailed illustration of the external temperature sensors 51. The external temperature sensors 51 are positioned in an external chute 52. A sampling diverter chute 53 inside the discharge chute 12 diverts a portion of the sand flow (shown by arrows) to the external chute 52, below the temperature sensors 51, and back into the discharge chute 12. The sand flows through the external chute 52 by means of gravity. The external temperature sensor 51 is, preferably, an infrared temperature sensor which measures real-time sand temperature, is thermally isolated, and does not make contact with the sand.

One or more events can be monitored in the batch mixer 13 to provide one or more signals to a standard computer system 54 which uses these signals to vary the speed of the continuous mixer 15. The computer system 54 uses one or more input/output algorithms to maintain the heating of the sand at a desired temperature and the speed of continuous mixer 15 to produce a continuous desired rate of delivery of coated sand.

Control of the sand heating process is executed by a programmable logic controller in a central processing unit (CPU) of the computer system 54 by means of suitable algorithms as are known in the art. The amount of sand in the sand heater 11 is, preferably, about 2,500 pounds and is continuously mixed in the sand heater 11 by methods well known in the art. The sand heating process consists of a high-fire-low-fire heating first program in which the heat produced by the sand heater burner is applied to the sand grains incrementally up to 40% of a sand temperature set point. Once this set point is reached the sand heating high-fire-low fire first program is changed to a second program in which the heat produced by the sand heater burner is applied to the sand grains incrementally up to 100% of the sand temperature set point. The sand temperature set point is between 300 and 500 degrees F., preferably about 400 degrees F. The first heating program may, for example, use a low-fire heat for 15 seconds and a high fire heat for 12 seconds. The second heating program thereafter may, for example, use low-fire heat for 15 seconds and a high fire heat for 12 seconds. The entire heating process can be completed in four minutes or less.

In order for the sand heating programs to perform properly it is critical to have a reliable and accurate sand temperature sampling system where the hot gases do not heat the temperature element so as to avoid introducing erroneous higher temperature readings. To achieve this, both ceramic and infrared temperature sensors are used. The ceramic sensors 50 are positioned at the bottom of the sand heater 11. For the infrared temperature sensor 51 an external chute 52 was designed to retrieve, sample, and return the heated sand from the sand heater discharge chute 12 while sampling the sand temperature within a second before the sand enters the sand batch mixer 13. The sand discharge chute 12 serves as the sand batch mixer 13 inlet chute.

The heat recovery system of the present invention recovers enough heat from the sand heater exhaust 27 to preheat the ambient intake air 20 to a maximum of 200 degrees F. By pre-heating the ambient intake air 20 using the exhaust heat 27 the sand heater efficiency is improved by reducing the sand heating time and the sand heater fuel consumption. Also, since the source of the heat recovery system is the sand heater exhaust 27, at the same time the intake air is preheated the sand heater exhaust temperature is lowered.

The sand heater exhaust gases are a mix of gases and particulates that are removed from the sand heater 11 in order to maintain a negative pressure in the sand heater combustion blower 24. The exhaust gas temperature ranges from ambient air at cold conditions to 900 degrees F. at maximum operating temperature. The exhaust gas flow ranges from 1600 CFM at ambient temp to 2500 CFM at 900 degrees F.

The heater exchanger 23 is a cross flow tube and shell heat exchanger that was designed to pre-heat the ambient intake air 20 up to 200 degrees F. by passing the 2500 CFM of exhaust air 27 from sand heater 11 through the shell interior tube 29 of the heat exchanger 23 in a whirlwind pattern to maximize the heat transfer coefficient.

The system ductwork is composed of two sub-systems, the intake air and the exhaust air. The intake air system is designed to handle intake air at 1600 CFM and is constructed using mild steel. The exhaust air system is designed to handle exhaust air at 2500 CFM between 750 F.-900 degrees F. and is constructed using 316 SS plate.

The high efficiency cyclone separator 41 is designed to separate the sand heater exhaust gas particulates from the 2500 CFM exhaust stream. The main function of the high efficiency cyclone fan 45 is to regulate the overall system static pressure fluctuations to improve the sand heater burner 25 operation as well as to remove the heavy particulates from the exhaust stream to reduce the cyclone fan 45 wear. The heavy particulates separated at the cyclone separator 41 are removed from the cyclone separator 41 via a double dump valve 42 to prevent any particulate accumulation.

The cyclone exhaust fan 45 handles 2500 CFM at 600 F, as well as a low amount of small particles remaining in the exhaust stream. The cyclone fan 45 is equipped with an inlet vortex damper to regulate the air flow and static pressure.

The double dump valve 42 allows removal of the sand heavy particulate from the exhaust stream. The double dump valve 42 is equipped with a dual gate and a common chamber where the heavy particulate is temporarily discharged while the upper gate close seals the air passage to the cyclone separator 41. Once the air passage to the cyclone separator 41 is sealed the lower gate opens and discharges the temporarily stored heavy particulate to a waste chute 43.

The continuous mixer 15 is a horizontal, linear, motor driven, variable speed mixer. In order for the continuous mixer system 15 to perform continuously and efficiently, the coated sand from the sand batch mixer 13 needs to be delivered instantly through the discharge chute 14 to the continuous mixer 15. This is achieved by adjusting the speed of the continuous mixer 15 by means of computer system 54. Just before the batch mixer 13 empties through discharge chute 14 and into the continuous mixer 15, the computer signals the continuous mixer 15 to increase its linear speed to a relatively high rate. Once the sand is discharged into the continuous mixer 15, the computer signals the continuous mixer 15 to decrease its linear speed to a lower rate. The higher the speed of the continuous mixer 15 the lower the level of sand in the continuous mixer 15, and the slower the speed of the continuous mixer 15 the higher the level of sand in the continuous mixer 15. Starting with a high continuous mixer speed and switching to a lower continuous mixer speed prevents surges in the height level of sand in the continuous mixer 15, thereby minimizing the amount of scrap and maintaining peak production capacity. A user of the system 10 experimentally determines the amount of time required for the continuous mixer 15 to run at a high speed and to run at a low speed for each batch size. The times are programmed into computer system 54. Generally, the continuous mixer 15 is set at a high speed just prior to the discharge of the sand batch mixer 13 since the sand batch mixer 13 discharges all of its contents at once. The higher speed of continuous mixer 15 prevents the level of sand in the continuous mixer from becoming too high. Thereafter, the speed of the continuous mixer 15 is slowed to prevent the level of sand in the continuous mixer 15 from becoming too low.

In the past it has been necessary to heat the sand in a sand heater, then transfer the heated sand to a sand batch mixer for resin coating, then empty the sand batch mixer, and then deliver the coated sand to the continuous mixer system. The steps were then repeated for each batch. In this past procedure the continuous mixer system is interrupted, causing the over all process to be relatively slow and inefficient. The method of the present invention provides a means to run the sand heating and sand coating (batch mixing) processes continuously so that resin coated sand is delivered continuously to the continuous mixer 15. In this manner, the continuous mixer 15 can operate continuously without interruption, providing a finished coated sand product.

Figure 3:
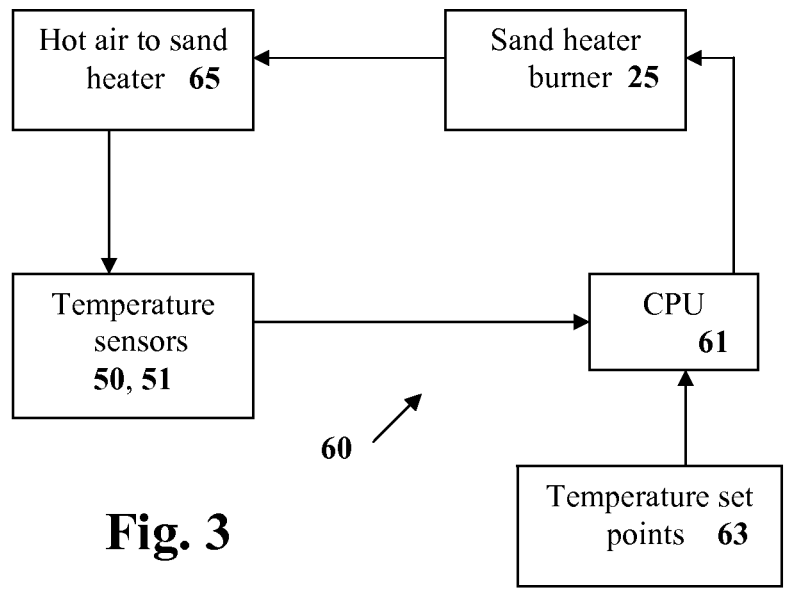
FIG. 3 illustrates the temperature control system for the sand heater.

Referring to the diagram in FIG. 3, the temperature control system 60 operates as follows. The central processing unit (CPU) 61 in the computer system 54 receives temperature information from the temperature sensors 50 in the sand heater 11 and the sensor 51 in the external chute 52, compares that information with the desired temperature set points 63, and determines the amount of activation to be applied to the sand heater burner 25, according to an algorithm utilizing the temperatures of the sand and the desired temperature set points 63. The output from the CPU 61 drives the sand heater burner 25 to heat the sand with hot ambient air 65 to the desired temperature. The temperature sensors transmit a feedback signal back to the CPU 61. In response to the feedback signals from the temperature sensors, the algorithm of the CPU 61 turns the sand heater burner 25 on or off in a closed loop fashion to maintain the desired sand temperature with hot ambient air 65.

Figure 4:
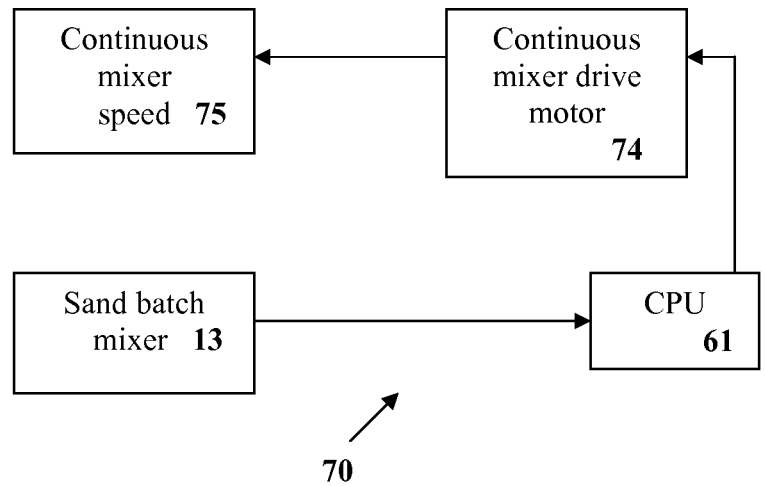
FIG. 4 illustrates the control of the continuous mixer speed.

Referring to the diagram in FIG. 4, the continuous mixer control system 70 operates as follows. The central processing unit (CPU) 61 in the computer system 54 receives information from the sand batch mixer 13 and determines the time and the amount of activation to be applied to the continuous mixer drive motor 74, according to an algorithm based upon event information obtained from the sand batch mixer 13. The output from the CPU 61 drives the continuous mixer drive motor 74 to regulate the continuous mixer speed as programmed.

With respect to the above description then, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those of ordinary skill in the art, it is not desired to limit the invention to the exact construction and operation shown and described, and accordingly, all suitable modifications and equivalents may be resorted to, falling within the scope of the invention.

The invention claimed is:

1. A method for the continuous production of coated sand, comprising the steps of:
  1) filling a sand batch heater with sand;
  2) heating said sand in said sand batch heater as a batch to a desired temperature with heated ambient air;
  3) recovering exhaust air at a negative pressure from said sand batch heater to preheat said ambient air in a heat exchanger, wherein said ambient air is not mixed with said exhaust air;
  4) delivering heated sand as a batch from said sand batch heater into a sand batch mixer to form a coating on said heated sand;
  5) delivering coated sand in said sand batch mixer all at once into a continuous mixer, wherein linear speed of said continuous mixer is automatically adjusted to maintain the level of said coated sand in said continuous mixer at a desired height, using computer processing of an input/output algorithm based upon event information from said sand batch mixer; and
  6) performing steps 1-5 continuously, thereby providing a means to run said sand batch heater and said sand batch mixer continuously so that said coated sand is delivered to said continuous mixer, allowing said continuous mixer to deliver said coated sand continuously without interruption until any desired number of batches are completed.

2. The method of claim 1 further comprising the step of measuring temperature in said sand batch heater with one or more temperature sensors and measuring the temperature of the heated sand being delivered from said sand batch heater into said sand batch mixer with a thermally isolated temperature sensor, wherein said thermally isolated temperature sensor is an infrared temperature sensor which measures real-time sand temperature and does not make contact with said heated sand, and wherein said one or more temperature sensors and said thermally isolated temperature sensor provide temperature signals to a computer system whereby said computer system uses said temperature signals to maintain temperature in said sand batch heater at a desired level.

3. The method of claim 1 wherein said sand batch mixer provides event signals to said computer whereby said computer activates said continuous mixer to operate at a first higher speed prior to said sand batch mixer delivering said coated sand to said continuous mixer, and said computer then activates said continuous mixer to operate at a second speed slower than said first higher speed to maintain a desired level of said coated sand in said continuous mixer, thereby eliminating surges in the height of said coated sand in said continuous mixer.

4. The method of claim 2 wherein said heated sand is delivered from said sand batch heater into a discharge chute wherein a portion of flowing heated sand is diverted by a diverter chute within said discharge chute into an external chute, wherein said thermally isolated temperature sensor is positioned within said external chute so that said thermally isolated temperature sensor does not contact said flowing heated sand, and wherein said external chute returns said portion of said flowing heated sand to said discharge chute.

5. The method of claim 1 wherein a fan draws said exhaust air from said sand batch heater through an internal portion of said heat exchanger to preheat said ambient air in an external portion of said heat exchanger, and further draws said exhaust air through a cyclone particle separator for removal of particles from said exhaust air.

6. A method for the continuous production of coated sand, comprising the steps of:
   1) filling a sand batch heater with sand;
   2) heating said sand in said sand batch heater as a batch to a desired temperature with heated ambient air;
   3) recovering exhaust air at a negative pressure from said sand batch heater to preheat said ambient air in a heat exchanger, wherein said ambient air is not mixed with said exhaust air;
   4) delivering heated sand as a batch from said sand batch heater into a sand batch mixer to form a coating on said heated sand;
   5) delivering coated sand in said sand batch mixer all at once into a continuous mixer, wherein linear speed of said continuous mixer is automatically adjusted to maintain the level of said coated sand in said continuous mixer at a desired height, using computer processing of an input/output algorithm based upon event information from said sand batch mixer; and
   6) performing steps 1-5 continuously, thereby providing a means to run said sand batch heater and said sand batch mixer continuously so that said coated sand is delivered to said continuous mixer, allowing said continuous mixer to deliver said coated sand continuously without interruption until any desired number of batches are completed;
   7) measuring temperature in said sand batch heater with one or more temperature sensors and measuring the temperature of the heated sand being delivered from said sand batch heater into said sand batch mixer with a thermally isolated temperature sensor, wherein said thermally isolated temperature sensor is an infrared temperature sensor which measures real-time sand temperature and does not make contact with said heated sand, and wherein said one or more temperature sensors and said thermally isolated temperature sensor provide temperature signals to a computer system whereby said computer system uses said temperature signals to maintain temperature in said sand batch heater at a desired level; and
   8) providing event signals from said sand batch mixer to said computer whereby said computer activates said continuous mixer to operate at a first higher speed prior to said sand batch mixer delivering said coated sand to said continuous mixer, and said computer then activates said continuous mixer to operate at a second speed slower than said first higher speed to maintain a desired level of said coated sand in said continuous mixer, thereby eliminating surges in the height of said coated sand in said continuous mixer.

7. The method of claim 6 wherein said heated sand is delivered from said sand batch heater into a discharge chute wherein a portion of flowing heated sand is diverted by a diverter chute within said discharge chute into an external chute, wherein said thermally isolated temperature sensor is positioned within said external chute so that said thermally isolated temperature sensor does not contact said flowing heated sand, and wherein said external chute returns said portion of said flowing heated sand to said discharge chute.

8. The method of claim 6 wherein a fan draws said exhaust air from said sand batch heater through an internal portion of said heat exchanger to preheat said ambient air in an external portion of said heat exchanger, and further draws said exhaust air through a cyclone particle separator for removal of particles from said exhaust air.

9. A method for the continuous production of coated sand, comprising the steps of:
   1) filling a sand batch heater with sand;
   2) heating said sand in said sand batch heater as a batch to a desired temperature with heated ambient air;
   3) recovering exhaust air at a negative pressure from said sand batch heater to preheat said ambient air in a heat exchanger, wherein said ambient air is not mixed with said exhaust air;
   4) delivering heated sand as a batch from said sand batch heater into a sand batch mixer to form a coating on said heated sand;
   5) delivering coated sand in said sand batch mixer all at once into a continuous mixer, wherein linear speed of said continuous mixer is automatically adjusted to maintain the level of said coated sand on said continuous mixer at a desired height, using computer processing of an input/output algorithm based upon event information from said sand batch mixer;
   6) performing steps 1-5 continuously, thereby providing a means to run said sand batch heater and said sand mixer continuously so that said coated sand is delivered continuously to said continuous mixer, allowing said continuous mixer to deliver said coated sand continuously without interruption until any desired number of batches are completed;
   7) measuring temperature in said sand batch heater with one or more temperature sensors and measuring the temperature of the heated sand being delivered from said sand batch heater into said sand batch mixer with a thermally isolated temperature sensor, wherein said thermally isolated temperature sensor is an infrared temperature sensor which measures real-time sand temperature and does not make contact with said heated sand, and wherein said one or more temperature sensors and said thermally isolated temperature sensor provide temperature signals to a computer system whereby said computer system uses said temperature signals to maintain temperature in said sand batch heater at a desired level; and 8) providing event signals from said sand batch mixer to said computer whereby said computer activates said continuous mixer to operate at a first higher speed prior to said sand batch mixer delivering said coated sand to said continuous mixer, and said computer then activates said continuous mixer to operate at a second speed slower than said first desired speed to maintain a desired level of said coated sand in said continuous mixer, thereby eliminating surges in the height of said coated sand in said continuous mixer, wherein said heated sand is delivered from said sand batch heater into a discharge chute wherein a portion of flowing heated sand is diverted by a diverter chute within said discharge chute into an external chute, wherein said thermally isolated temperature sensor is positioned within said external chute so that said thermally isolated temperature sensor does not contact said flowing heated sand, wherein said external chute returns said portion of said flowing heated sand to said discharge chute, and wherein a fan draws said exhaust air from said sand batch heater through an internal portion of said heat exchanger to preheat said ambient air in an external portion of said heat exchanger, and further draws said exhaust air through a cyclone particle separator for removal of particles from said exhaust air.

\* \* \* \* \*